Nov. 3, 1953     F. G. MULLER     2,657,896
BUTTERFLY VALVE ASSEMBLY WITH CONTINUOUS
ANNULAR SEALING MEANS
Filed July 6, 1948     2 Sheets-Sheet 1
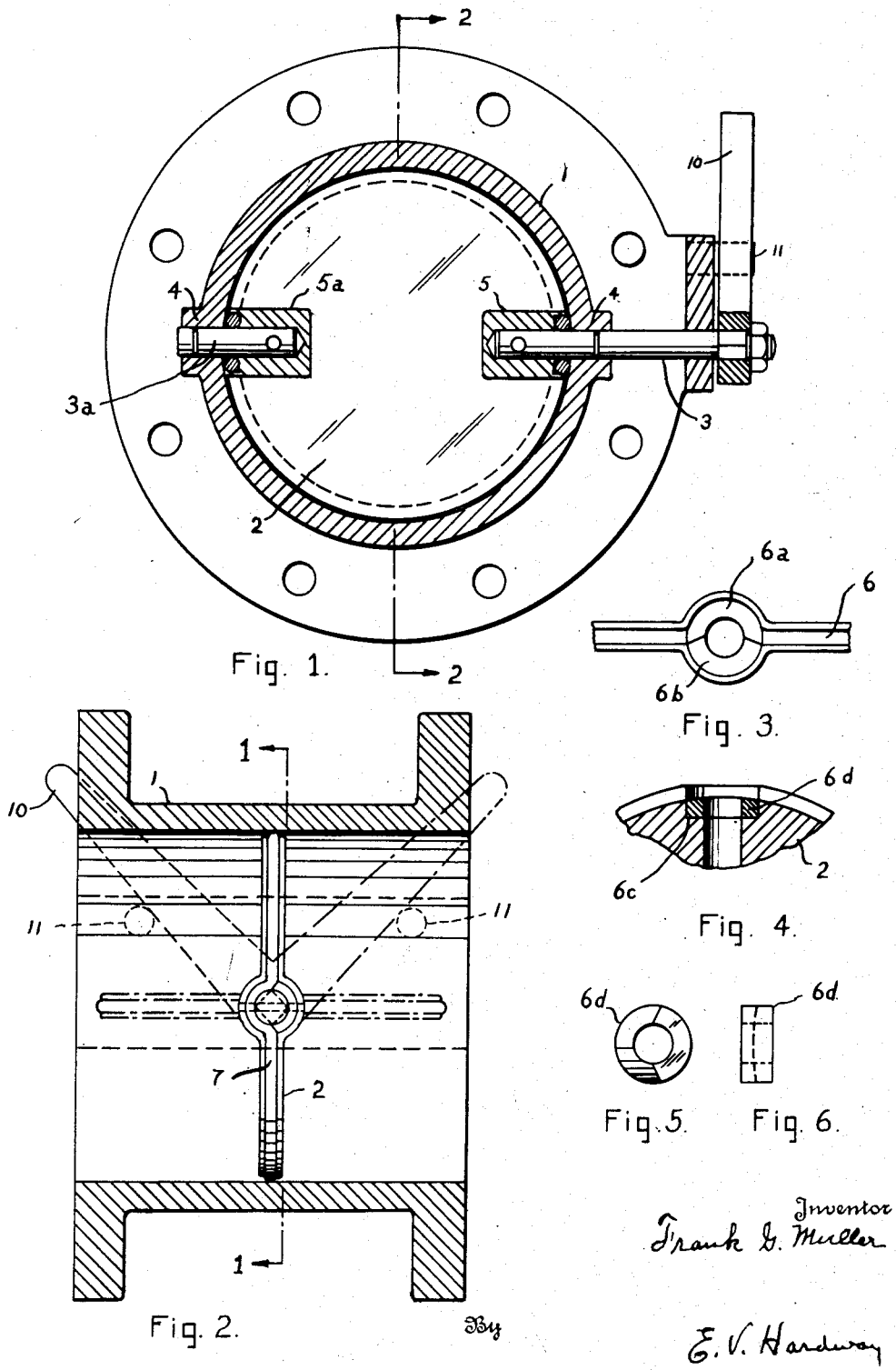

Nov. 3, 1953  F. G. MULLER  2,657,896
BUTTERFLY VALVE ASSEMBLY WITH CONTINUOUS
ANNULAR SEALING MEANS
Filed July 6, 1948  2 Sheets-Sheet 2
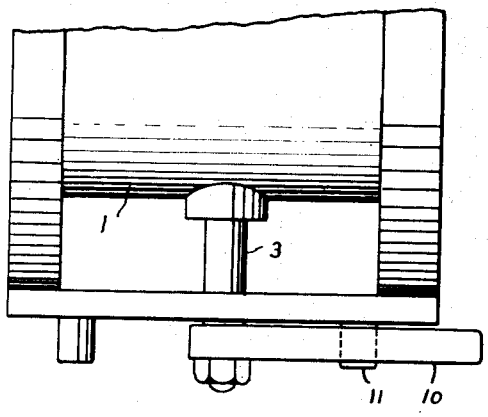
Fig. 7.
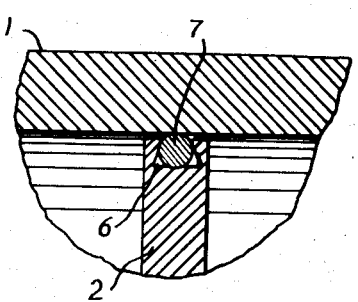
Fig. 8.
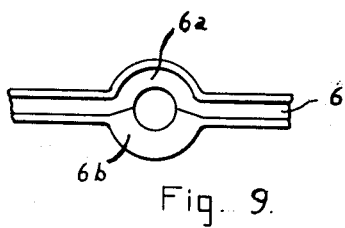
Fig. 9.
Fig. 10.
Fig. 11.  Fig. 12.
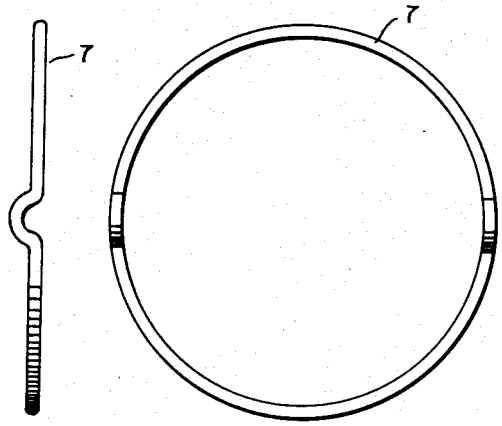
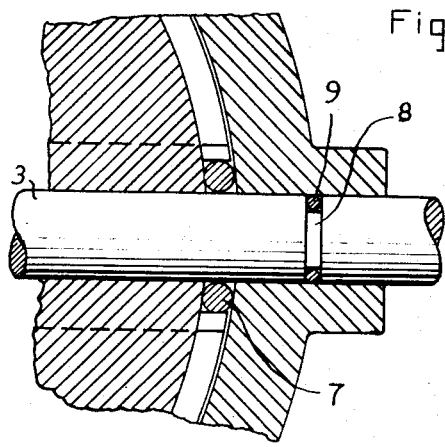
Fig. 13.
Inventor
Frank G. Muller
By
E. V. Hardway
ATTORNEY

Patented Nov. 3, 1953

2,657,896

UNITED STATES PATENT OFFICE 2,657,896

BUTTERFLY VALVE ASSEMBLY WITH CONTINUOUS ANNULAR SEALING MEANS

Frank G. Muller, La Porte, Tex.

Application July 6, 1948, Serial No. 37,185

1 Claim. (Cl. 251—11)

This invention relates to a butterfly valve assembly, with continuous annular sealing means.

An object of the invention is to provide a valve assembly of the character described specially designed for use where the valve is required to completely shut off the flow of fluid without leakage when the valve is in closed position.

It is another object of the invention to provide, in an assembly of the character described, novel means for forming leak proof seals not only between the valve and casing but also at the shaft bearings of the valve casing so as to displace the usual stuffing box arrangement.

In the present disclosure of the invention the valve is mounted in the casing by means of stub shafts which are equipped with efficient seals between the shafts and the casing.

Primarily the invention embodies novel means, carried by the valve, for forming a continuous seal between the valve and casing and around the stub shafts when the valve is in closed position.

Other objects and advantages will be apparent from the following specification which is illustrated by the accompanying drawings wherein—

Figure 1 is a cross-sectional view of the valve assembly taken on the line 1—1 of Figure 2.

Figure 2 is a longitudinal, sectional view taken on the line 2—2 of Figure 1 and showing the valve closed.

Figure 3 is an enlarged, fragmentary edge view of the valve illustrating one type of valve hub.

Figure 4 is a fragmentary, sectional view thereof.

Figures 5 and 6 show end elevational and side elevational views, respectively, of annular inserts employed.

Figure 7 is a fragmentary, plan view of the assembly.

Figure 8 is a fragmentary, sectional view showing the valve in closed position.

Figure 9 is an enlarged, fragmentary edge view of the valve illustrating a modified form of valve hub.

Figure 10 is a fragmentary, sectional view thereof.

Figure 11 is an edge view of the circular valve seal after being fitted upon the valve disc.

Figure 12 is an elevational view thereof, and

Figure 13 is a fragmentary, transverse, sectional view showing the valve hub seal.

Referring now more particularly to the drawings the numeral 1 designates a form of valve casing which may be employed.

The disc valve 2 is mounted in this casing. This valve is mounted, in any approved manner. As shown it is mounted by means of the stub shafts 3, 3a which, in turn, are mounted to rotate in similar aligned bearings 4, 4 in the casing. In the present illustration the valve 2 is shown as formed with the transversely disposed hubs 5, 5a into which the inner ends of the shafts 3, 3a extend and to which said shafts may be secured.

Around the periphery of the valve 2 there is a dovetailed groove 6 and at the outer ends of the hubs this groove is formed with the arcuate portions, as 6a, which surround the shafts, on one side of the corresponding shaft, and on the other side of each shaft the valve is formed with a plane arcuate face, as 6b (as best shown in Figure 9), which fits closely against the opposing portion of the valve casing.

There is a seal ring 7 designed to be seated in the groove 6, 6a so as to form a continuous seal ring all the way around the valve.

When the seal ring 7 is moulded it will be in the form of a plane circular ring but when fitted into the groove 6, 6a it will be of the shape indicated in Figures 11 and 12, that is, the portion of it partly surrounding the corresponding shaft and lying in the groove 6a will be offset with respect to the plane of the ring, as is more clearly indicated in Figure 11.

As indicated in Figures 3 and 4, in this form of the valve hub there is a continuous circular socket, as 6c, formed in the outer margin of the valve around each shaft bearing and provided to receive a filler block, as 6d.

The outer face of this block 6d on one side of shaft is flush with the outer periphery of said valve but on the other side is arcuately grooved to form a continuation of the groove 6 around the shaft thus providing, in this form, the arcuate groove 6a and the plane face 6b as in Figure 9, and in this form the seal ring 7 is installed in identically the same manner as heretofore explained.

In both forms the shafts 3 and 3a are provided with external annular grooves 8 within the bearings 4 to receive conventional O-rings 9 to form effective seals between the valve casing and the stub shafts on which the valve is mounted, said shafts forming, in effect, a stem on which the valve operates.

In installation the seal ring 7 is seated in the groove 6, 6a. The ring 7 is preferably moulded round in cross-section but, as hereinbefore stated, the groove 6, 6a is preferably dovetailed in cross-section so as to allow the sealing material to flow toward the corner of the groove when subjected to compression.

When the seal ring is installed on the valve the valve may then be located in the casing and the stub shafts 3, 3a then installed, as illustrated in Figure 1.

It will be noted from an inspection of the figures that the disc-like valve 2 is of slightly less transverse diameter than the inside transverse diameter of the casing but the cross-sectional diameter of the seal ring 7 is slightly greater than the distance between the bottom of the groove 6, 6a and inside of the casing when the valve is closed so that when installed the seal ring will be under slight compression to obtain an initial, fluid tight, seal.

As illustrated there is an operating lever 10 fixed on the outer end of the stub shaft 3 and whose range of movement is limited by spaced stops 11, 11 so that the valve may be moved to completely closed position, as shown in Figure 2, or to open position, as shown in dotted lines in Figure 2.

As the valve is moved toward closed position the seal ring 7 progressively seals the clearance spaces between the valve 2 and the inside wall of the valve casing until the valve is turned to a perpendicular position relative to the flowway of the valve casing whereupon the entire periphery of the valve is sealed with the casing wall so as to form a fluid tight seal; however, the portions of the ring 7 within the arcuate portions 6a of the groove 6 are under compression at all times and in all positions of the valve, the compression varying slightly, if at all, during the valve movements.

The fluid pressure exerted on the seal ring 7 will tend to squeeze the sealing material thereof more firmly into the clearance spaces of the groove 6, 6a when the valve is closed, thus forming a fluid tight seal throughout.

The drawings and description are illustrative merely while the broad principle of the invention will be defined by the appended claim.

What I claim is:

A valve assembly comprising, a casing having a passageway for fluid therethrough and also having stem bearings, a disc-shaped valve in the casing movable to one position to close said passageway and to another position to open the passageway, said valve being formed with oppositely disposed hubs, a stem in said bearings to which the valve is secured, the outer ends of said hubs each having a circular socket around the stem, a filler block in each socket, said valve having a continuous peripheral groove formed with arcuate portions extending through said filler blocks on one side of the stem, said filler blocks presenting flush faces on the other side of the stem which fit closely against the inner wall of the housing, and a continuous annular seal ring fitted into the groove of said valve and filler blocks and forming a continuous seal with the housing all the way around the valve when the valve is closed.

FRANK G. MULLER.

References Cited in the file of this patent

UNITED STATES PATENTS

| Number | Name | Date |
|---|---|---|
| 1,682,075 | Foulds | Aug. 28, 1928 |
| 1,813,126 | Sheppard | July 7, 1931 |
| 1,860,619 | Pfau | May 31, 1932 |
| 2,385,510 | Harwood | Sept. 25, 1945 |
| 2,427,787 | Hunter | Sept. 23, 1947 |

FOREIGN PATENTS

| Number | Country | Date |
|---|---|---|
| 177,010 | Switzerland | of 1935 |
| 435,059 | Great Britain | of 1935 |
| 887,167 | France | of 1941 |